United States Patent [19]

Colas

[11] Patent Number: 4,597,687

[45] Date of Patent: Jul. 1, 1986

[54] DEVICE FOR CONNECTING A TUBE AND A SHEET METAL ELEMENT

[76] Inventor: François Colas, 10, avenue du Petit Chambord, 92340 Bourg-La-Reine, France

[21] Appl. No.: 499,791

[22] Filed: May 31, 1983

[30] Foreign Application Priority Data

Jun. 3, 1982 [FR] France .................. 82 10080

[51] Int. Cl.⁴ .............. F16B 9/00; F16L 41/00; E06C 7/08
[52] U.S. Cl. .................. 403/242; 403/274; 403/284; 403/282; 182/228; 29/525; 29/523
[58] Field of Search ........... 411/44, 45, 69, 501; 29/525, 523, 512; 285/3.82, 205; 403/242, 248, 249, 368, 372, 282, 273, 274, 276, 277, 278, 279, 280, 284, 263; 182/228

[56] References Cited

U.S. PATENT DOCUMENTS

| | | | |
|---|---|---|---|
| 968,625 | 8/1910 | Wood et al. ............ | 403/274 X |
| 2,735,698 | 2/1956 | Brinen .................. | 29/525 |
| 2,958,127 | 11/1980 | Johnson ................ | 403/281 |
| 3,024,300 | 3/1962 | Martin ................... | 403/282 X |
| 3,119,435 | 1/1964 | Greenman ............ | 182/228 |
| 3,168,938 | 2/1965 | Shaver .................. | 182/228 |
| 3,283,402 | 11/1966 | Larson .................. | 182/228 |
| 3,388,454 | 6/1968 | Willis ..................... | 182/228 |
| 3,466,738 | 9/1969 | Mount ................... | 29/525 |
| 3,477,120 | 11/1969 | Werner et al. ........ | 182/228 |
| 3,678,535 | 7/1972 | Charles ................. | 411/44 X |
| 3,766,631 | 10/1973 | Scheitlin et al. ...... | 29/523 X |
| 4,205,426 | 6/1980 | Stillman, Jr. .......... | 182/228 |
| 4,219,102 | 8/1980 | Ducresot et al. ..... | 182/228 |
| 4,261,436 | 4/1981 | Stillman, Jr. .......... | 182/228 |
| 4,389,134 | 6/1983 | Colas .................... | 403/263 |
| 4,406,048 | 9/1983 | Bailey ................... | 182/228 |

FOREIGN PATENT DOCUMENTS

| | | |
|---|---|---|
| 571296 | 2/1933 | Fed. Rep. of Germany . |
| 2635842 | 11/1977 | Fed. Rep. of Germany . |
| 556581 | 4/1957 | France .................. 182/228 |
| 1175422 | 11/1958 | France .................. 182/228 |
| 2477920 | 9/1981 | France . |
| 587952 | 6/1947 | United Kingdom . |
| 1067679 | 5/1967 | United Kingdom ......... 182/228 |
| 1204724 | 9/1977 | United Kingdom . |
| 2047833 | 4/1979 | United Kingdom . |

Primary Examiner—Cornelius J. Husar
Assistant Examiner—Todd G. Williams
Attorney, Agent, or Firm—Oblon, Fisher, Spivak, McClelland & Maier

[57] ABSTRACT

This invention relates to a process and a device for an angular connection of the end of a tube with one (or more) sheet metal element(s), quickly and reliably.

The forward portion of a tubular shape (1) is contracted by force-fitting in a ring (2) whose outside dimensions are approximately equal to those of the opening (4) and the inside dimensions, less than the initial outside dimensions of the tubular shape, and whose rear end (6) is flush with the rear face (7) of the sheet metal (3), this ring (2) being compressed on the thickness of the sheet metal (3) between the tubular shape (1) and the opening (4) in the sheet metal, while the end (10) of the tubular shape is flanged outward in a corolla on the rear face (7) of the sheet metal element.

This process can be used in particular to attach rungs to side rails of a ladder or rods to rails of guard railings and also for making scaffolding or tube exchangers.

13 Claims, 4 Drawing Figures

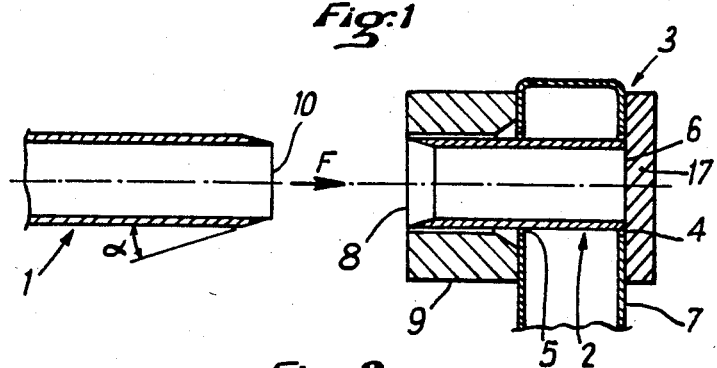
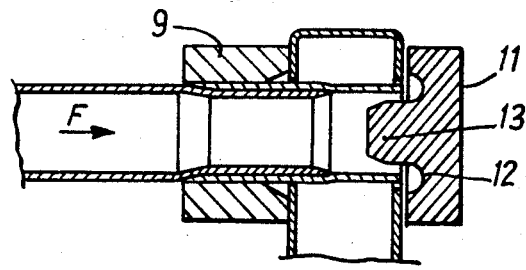
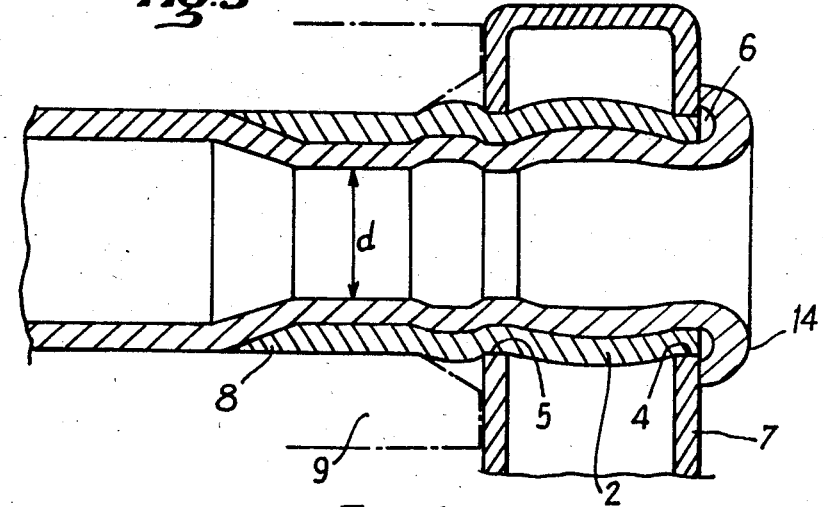
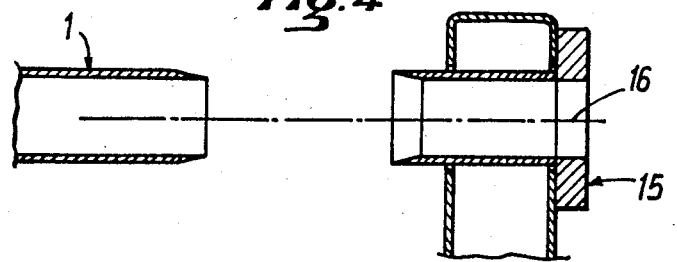

DEVICE FOR CONNECTING A TUBE AND A SHEET METAL ELEMENT

BACKGROUND OF THE INVENTION

Various devices for angular connection of a tube end and a sheet metal element are known in which an opening has been drilled with dimensions at least equal to those of the outside section. Thus, for connecting tubes in the openings of tube plates of heat exchangers, expansion and welding are currently used. Force-fitting connection of tubes in openings as a result of the insertion of a ring solid with the opening, as described in the patent FR. No. 2 477 920, is also known.

OBJECT OF THE INVENTION

The object of this invention is a device which, while exhibiting similarities with FR. No. 2 477 920, has as its main object, not the connection of two elements of tubes, but the angular connection of an end of a tube and a sheet metal element, very quickly and very reliably.

FIELD OF UTILIZATION OF THE INVENTION

This device can be used, for example, for the joining of rungs and side rails of ladders or rods and rails of guard railings, but also for many other applications such as the making of scaffolding or exchanger nests.

DEFINITIONS

For the clarity of the description, hereafter the face of the sheet metal that appears on the side of the tube will be considered as its forward face and its opposite face as its rear face. The portion of the tube that is on the side of the end connected to the sheet metal will also be considered as its forward portion. In a manner quite similar to FR. No. 2 477 920, the device, object of the invention, involves the use of a ring which is inserted between the tube and the opening in the sheet metal. Its sheet metal side end is hereafter designated as the rear end, and the tube side end as its forward end. The connection is made by bringing together the forward parts of the tube and the sheet metal that is facing it.

GENERAL DISCUSSION OF THE INVENTION

Once the device is constructed, it appears as follows: The forward part of the tube is contracted by force-fitting in an approximately cylindrical ring whose rear end, preferably with a plane section and a free edge, is flush with the rear face of the sheet metal. The inside dimensions of the rings are less than the initial outside dimensions of the tube on its non-fitted portion. Its outside dimensions, at least at its rear end, are equal to those of the opening in the sheet metal in which this end is radially compressed over the thickness of the sheet metal between the tube and said opening. Moreover, the forward end of the tube projects beyond the rear face of the sheet metal and is flanged outward in a corolla on the rear face of the sheet metal element.

In particular, if the sheet metal element under consideration is a rear element of a sheet metal bent in a U, or even of a closed shape, for example, a shape constituting a side rail of a ladder or a handrail of a guard rail, another coaxial opening of the same size can be drilled in the part of the sheet metal bent ahead of the main opening at the exit of which the end of the tube is flanged. Then, a ring with a length at least equal to the axial distance between the two openings in the sheet metal is used. It goes through the two openings with its rear end being flush with the rear face of the sheet metal element. The tube and the ring pass through the two openings. The forward portion of the tube is contracted along the length of the ring which is compressed between the tube and each of the openings in the passage through the two thicknesses of the sheet metal. As before, the forward end of the tube is flanged over the rear face of the rear sheet metal element.

The process for making the device is easily deduced from the above description. An opening with dimensions at least equal to the outside dimensions of the tube is made in the sheet metal element. If the sheet metal element is an element of a sheet metal bent in a U or of a closed shape, an identical and coaxial opening is drilled also in the forward part of the sheet metal.

The end of the tube which must be connected with the sheet metal element (or the shape) is prepared by chamfering the forward end of the tube. Thus, a male shape is given to the end of the tube to be connected.

A cylindrical ring is prepared whose outside dimensions are approximately equal to those of the opening, made smaller for the clearance necessary for its easy introduction into the opening while the inside dimensions are less than the outside dimensions of the tube. This ring ends at the rear in a plane section while its forward end is conically bored which gives it a female opening. The ring is engaged in the opening with its rear end coming flush with the rear surface of the sheet metal. The ring is axially locked in the sheet metal, for example, by an nondeformable die which grips it at the front of the sheet metal element and/or by a hollow or solid rear stop; in the latter case, this rear stop exhibits a hole having a section at least equal to the inside section of the ring, but less than its outside section.

The tube is exhibited in the axis of the ring with its male chamfered end facing the female bored end. The tube is then fitted axially with force into the ring, for example, according to the procedure described in FR. No. 2 356 463 or FR. No. 2 477 920, until the beveled end of the tube projects beyond the rear face of the sheet metal element by a length at least equal to the thickness of the tube, after the solid stop has been withdrawn.

The ring, tightened down at least over the thickness of the sheet metal, cannot expand and the tube must be contracted at least along a length corresponding to the thickness of the opening plus, possibly, along the length of the ring gripped in a nondeformable die. The beveled forward end of the tube is flanged in the shape of a collar flanged outward in a corolla, on the rear face of the sheet metal. This flanging can be done simply by presenting on the rear face of the sheet metal a stop with a peripheral groove and axial core, the core having as dimensions, approximately the inside dimensions of the tube contracted by passage in the ring and the opening.

The end of the tube of the rear face of the sheet metal can also be allowed to project axially by a length at least equal to the thickness of its wall, then this beveled end can be flanged by countercurrent action of a punch having a peripheral groove.

Preferably, a tube and a ring having initially approximately the same inside dimensions are used. The outside diameter of the ring can be equal to or slightly greater than the outside diameter of the tube (on the order of 1 mm, for example). The opening in the sheet metal will then have as dimensions, except for the necessary clearance, the outside dimensions of the tube.

BRIEF DESCRIPTION OF THE DRAWINGS

The invention will be better understood by the description below of an embodiment and by examination of the accompanying figures. The embodiment should, however, be understood as not limiting the invention.

In FIG. 1, a U-shaped sheet, a ring already positioned in the sheet metal and locked by a die and a full stop are shown in section while a portion of the tube intended to be connected appears in the axis of the ring.

In FIG. 2, the three preceding elements are seen in section during the force-fitting of the tube in the ring, while a stop with a groove is presented in the axis of the tube to be connected and locked against the rear face of the sheet metal.

In FIG. 3, the connecting device according to the invention with a tube and a sheet metal element is shown in section, on a larger scale.

In FIG. 4, a variant of FIG. 1 where the ring is locked by an annular stop at the rear of the sheet metal is shown in section.

DETAILED DESCRIPTION OF THE PRESENTLY PREFERRED EMBODIMENTS

In FIG. 1 are shown the forward part of an aluminum tube (1) of φ16/18 mm, a ring (2) with the same diameters and a sheet (3) bent in a U which has two coaxial openings (4) and (5) with the same 18.1 mm diameters. The ring (2) is placed in the openings (4) and (5) of the U-shaped sheet with its rear end (6) abutting a solid rear stop (17) that is flush with the rear face (7) of the sheet metal. The ring (2) is bored out conically at the front (8) which gives it a female opening. It is locked by a die (9) with three gripping jaws, located in front of the U-shaped sheet (3) and/or by the solid rear stop (17). It can be seen that the forward end (10) of the tube (1) is chamfered along an angle α on the order of 10°.

To assure the connection of the tube (1), the ring (2) and the sheet metal (3), all that is required is to advance the tube (1) in direction F and to force-fit it into the ring and the sheet metal.

In FIG. 2, the connection is shown being made. It is seen that, as described in FR. No. 2 477 920, during the advance of the tube (1) in the ring (2) and the resultant contraction, the conical bore of the tube (1) changes into a stepped bore. The end (10) properly so-called of the tube (1) has a wall with an approximately zero thickness. This end is not contracted, having already approximately the inside diameter of the ring (2). On the other hand, the portion of the tube (1) following it is radially contracted.

It must be added, as is better shown in FIG. 3, on a larger scale, that the ring (2) no longer has a cylindrical shape, but is slightly convex. Actually, in the free portions of the ring (2) between the openings (4) and (5) and between the die (9) and the opening (5) under the thrust of the tube (1), the ring (2) swells into a drum. Actually, during its advance in direction F, the tube (1) is quite contracted at the site of the die (9), but, beyond, its outside surface, by rubbing with friction against the inside surface of the ring (2), is expanded outward beyond the elastic limit. The inside diameter d of the tube (1) in its contracted part is approximately 14 mm.

The stop (11), provided with a peripheral groove (12) and a core (13), is present axially facing the tube (1). When the end (10) of the tube (1) projects beyond the rear face (7) of the sheet metal, it is forced to follow the surface of the groove (12). It is opened out, then is flanged outward and, as it were, crimps the tube (1) on the rear face (7) of the sheet metal (3), as shown in FIG. 3.

This crimping could also be done by first allowing the front (10) of the tube (1) to pass axially beyond the face (7), then by flanging this end over by axial pressure in the direction opposite direction F by a punch with a shape very similar to that of the stop (11). This flanging, in the shape of a rounded collar (14) of the end of the tube is then very similar to the operation for making a rolled edge for an aerosol can.

In this case, the ring (2) can be locked either by a die (9) or by an annular stop (15) such as shown in FIG. 4. The stop (15) is then drilled with an opening (16) with dimensions at least equal to the inside dimensions of the ring (2), this opening allowing the end (10) to advance beyond the rear face (7) of the sheet metal (3). When this end (10) has projected sufficiently beyond the face (7), the stop (15) is withdrawn. The tube (1) can then be flanged as explained above by action of a punch with a shape similar to that of the stop (11), but which is mobile and advances axially against the tube (1) in the direction opposite that of arrow F.

The annular stop (15) can possibly be cast with the sheet metal element (3) which then has a spot facing against which the ring (2) strikes during the advance of the tube (1).

The device for connecting a tube and a sheet metal element as described here relates to a right angle connection, but it is easily seen that the device described is further very usable if the tube makes an angle on the order of 30° to 40° with the sheet metal (or the hollow shape).

The tube (1), the ring (2) and the openings (4) and (5) have circular shapes. They could just as well have square or hexagonal shapes, or others, provided that the angles, if they exist, are rounded.

I claim:

1. Device for an angular connection of a tubular shape and a double or U-shaped metal sheet element in which openings with dimensions at least equal to those of the outside section of said tubular shape where formed, characterized in that a forward portion of said tubular shape is contracted by force-fitting into a ring the outside dimensions of which are approximately equal to those of said openings and the inside dimensions of which are less than the initial outside dimensions of said tubular shape, and whose rear end is flush with the rear face of said sheet metal element, said ring being compressed by said sheet metal element between said tubular shape and said openings of said sheet metal element, while the end of said tubular shape is flanged outward in a corolla on the rear face of said sheet metal element.

2. Device as in claim 1, wherein said tubular shape and said ring initially have the same inside and outside dimensions.

3. Process for making the connecting device as in claim 1, wherein the following operations are performed successively:
 (a) coaxiall openings with dimension at least equal to the outside dimensions of said tubular shape are made in said sheet metal element;
 (b) the end of said tubular shape is chamfered;
 (c) said ring is engaged in said openings of said sheet metal element, said ring having a plane section at a first end and a conical bore at the other end, said ring being engaged with its bored end at the front of said sheet metal element, and the end of said ring with a plane section being flush with the rear surface of said sheet metal element;

(d) said ring is locked axially;

(e) said tubular shape is force-fitted forward in said ring and the opening in said sheet metal element initially facing the chamfered end of said tubular shape opposite the bored end of said ring, the fitting being continued until the chamfered end of said tubular shape projects beyond the rear end of said ring, in the plane of the rear face of said sheet metal element; and (f) the end of the said tubular shape is flanged outward on said sheet metal element in the shape of a rounded collar in a corolla on the rear face of said sheet metal element.

4. Process as in claim 3, wherein, during the force-fitting of said tubular shape in said ring and the opening said sheet metal element, said ring is locked axially by an annular stop located at the rear of said sheet metal element, said annular stop allowing front of said tubular shape to pass freely when it has gone through said ring.

5. Process as in claim 3, wherein, during the force-fitting of said tubular shape in said ring, said ring is locked by a nondeformable die that grips said ring at the front of said sheet metal element.

6. Process as in any one of claims 3, 4, or 5, wherein the flanging of said tubular shape is assured by placing, at the rear of said sheet metal element, a stop with a peripheral groove and a central core the section of which is approximately equal to the inside section of said tubular shape after contraction by fitting into said ring, the end of said tubular shape advancing by rolling outward in a corolla along the surface of said peripheral groove.

7. Process as in any one of the claims 3, 4, or 5, wherein the flanging of the end of said tubular shape is assured by countercurrent action of a punch having a peripheral groove.

8. Process for making connection in accordance with claim 1, wherein said sheet metal element is bent forward in a U and has in the forward branch of the U a coaxial opening identical with the opening located on the rear branch, and wherein, before force-fitting of said tubular shape, said ring is engaged simultaneously in said two coaxial openings, its end with a straight section coming flush with the rear face of said rear branch of said U-shaped sheet metal element.

9. Device for angular connection of a tubular shape and two sheet metal elements, of the type in which:
(a) each sheet of said two sheet metal elements has formed therethrough an opening, with dimensions at least equal to those of the outside section of said tubular shape,
(b) said device further comprising a ring whose outside dimensions are substantially equal to those of said openings, and whose inside dimensions are less than the initial outside dimensions of said tubular shape, and whose one end is flush with an outside face of one of the sheets of said two sheet metal elements, and a free end portion of said tubular shape is contracted by force fitting into the other end of said ring, said ring being compressed between said tubular shape and said openings in said two sheet metal elements, while the free end of said tubular shape is flanged outwardly in a corolla on said outside face of said one sheet of said two sheet metal elements.

10. Process for connecting angularly a tubular shape and a two-sheet sheet metal element, wherein the following steps are performed successively:
(a) a throughgoing opening is made in each of the two sheets of said two-sheet sheet metal element, said openings having dimensions at least equal to the outside dimensions of said tubular shape;
(b) the free end of said tubular shape is chamfered;
(c) a ring, whose outside dimensions are approximately equal to those said openings whose inside dimensions are less than the outside dimensions of said tubular shape, is engaged into said openings in said two-sheet sheet metal element, said ring having a plane section at a first end and a conical bore at the other end and the engaging relationship being such that said other end of said ring is flush with one outside face of said two-sheet sheet metal element;
(d) said ring is locked axially;
(e) said tubular shape is force-fitted into said ring and said openings in said two-sheet sheet metal element, by first presenting said chamfered free end of said tubular shape opposite said bored end of said ring, the fitting being continued until said chamfered free end of said tubular shape projects beyond one outside face of said two-sheet sheet metal element; and
(f) said free end of said tubular sheet is flanged outwardly on said two-sheet sheet metal element into the shape of a round collar in a corolla onto said outside face of said two-sheet sheet metal element.

11. A method of connecting a tubular shape to a sheet metal element comprising two spaced sheets of metal, said method comprising the steps of:
(a) forming a through-hole through each of said two spaced sheets of metal, said through-holes having internal dimensions slightly larger than the external dimensions of the tubular shape to be connected to the sheet metal element;
(b) positioning a ring in said through-holes such that one end of said ring is flush with the outer surface of one of said two spaced sheets of metal and said other end of said ring projects outwardly from said outer surface of said other of said two spaced sheets of metal toward said tubular shape, said ring having an outwardly opening internal chamfer at said other end and having both external and internal dimensions closely matched to those of said tubular shape;
(c) gripping said ring in a die which provides peripheral support of said ring from said other end of said die to a point slightly spaced from the outer surface of said other of said two spaced sheets of metal;
(d) providing an external chamfer on the leading end of said tubular shape which is sized and shaped to match the outwardly opening internal chamfer at said other end of said ring;
(e) forcing said tubular shape axially through said ring until said tubular shape projects beyond said one of said two spaced sheets of metal, during which step said die causes said tubular shape to distort radially inwardly as said tubular shape passes from said other end of said die to said point, the absence of said die between said point and said other of said two spaced sheets of metal permits said tubular shape to recover elastically, distorting said ring outwardly to form a first collar abutting said other of said two spaced sheets of metal between said point and said other of said two spaced sheets of metal and to come into close contact with the inner surfaces of said through-holes in said two spaced sheets of metal; and (f) turning outwardly the portion of said tubular shape which projects beyond said one of said two spaced sheets of metal to form a second collar abutting said one of said two spaced sheets of metal.

12. A method as recited in claim 11 wherein step (f) is effected by forcing the leading end of said tubular shape into a groove in a stop which guides the advancing leading edge of said tubular shape so that it distorts outwardly and turns back on itself.

13. A method as recited in claim 11 wherein said through-holes, said ring, and said tubular shape are all round in cross-section.

* * * * *